United States Patent [19]

Joseph et al.

[11] Patent Number: 4,472,861
[45] Date of Patent: Sep. 25, 1984

[54] MOUNTING ARRANGEMENT FOR PLASTIC WORKPIECES

[75] Inventors: A. David Joseph, N. Muskegon; Charles J. Mullally, Muskegon, both of Mich.

[73] Assignee: Sealed Power Corporation, Muskegon, Mich.

[21] Appl. No.: 336,966

[22] Filed: Jan. 4, 1982

[51] Int. Cl.³ .............................................. F16B 5/02
[52] U.S. Cl. ....................................... 24/289; 24/290; 210/445; 403/19; 403/408; 411/547
[58] Field of Search ............... 210/445, 455, 168, 171; 29/163.5 F; 411/368, 531, 539, 542, 547, 533, 105, 366, 367, 369, 546; 24/141, 202, 289, 290, 293, 292, 457, 458, 291, 295; 403/11, 19, 405, 408

[56] References Cited

U.S. PATENT DOCUMENTS

| | | | |
|---|---|---|---|
| 1,287,426 | 12/1918 | Pleister | 403/19 |
| 2,068,968 | 1/1937 | Urbanek et al. | 411/367 |
| 3,218,906 | 11/1965 | Dupree | 411/533 |
| 3,286,577 | 11/1966 | Weidner | 411/542 |
| 3,362,276 | 1/1968 | Gould | 411/542 X |
| 4,029,426 | 6/1977 | Sims, Jr. | 403/408 |
| 4,050,771 | 9/1977 | Watson et al. | 403/408 X |
| 4,238,165 | 12/1980 | Wagner | 403/408 |
| 4,264,443 | 4/1981 | Anderson et al. | 210/445 X |
| 4,324,517 | 4/1982 | Dey | 411/105 X |

FOREIGN PATENT DOCUMENTS 1455235  11/1976  United Kingdom ................ 411/531

Primary Examiner—William E. Lyddane
Assistant Examiner—James R. Brittain
Attorney, Agent, or Firm—Barnes, Kisselle, Raisch, Choate, Whittemore & Hulbert

[57] ABSTRACT

A mounting arrangement for clamping plastic workpieces such as replacement engine and transmission covers in the automotive aftermarket. The mounting arrangement includes a metal eyelet crimped over an annular bead on the workpiece and having a flat central portion with a mounting opening. An annular metal spacer is captured on and carried by the eyelet surrounding the mounting opening to position the head of a mounting bolt above the plane of the workpiece for access by a socket wrench or the like.

2 Claims, 3 Drawing Figures

MOUNTING ARRANGEMENT FOR PLASTIC WORKPIECES

The present invention relates to arrangements for mounting or clamping deformable workpieces of plastic construction, for example, and more particularly to arrangements of the described type which include means for absorbing clamping stresses other than in the plastic material of the workpiece. Yet more specifically, the invention relates to improvements in the mounting arrangement disclosed in U.S. Pat. No. 4,264,443 assigned to the assignee hereof.

BACKGROUND AND OBJECTS OF THE INVENTION

The above-noted U.S. patent discloses a mounting arrangement which includes a plastic frame having an opening defined by an annular bead, and a one-piece metal eyelet having a peripheral flange crimped over the plastic bead and a flat central portion with a central mounting opening. A headed fastener projects through the mounting opening into an aligned opening on a support structure, whereby the plastic frame is tightly clamped to the support structure with clamping forces from the bolt head being absorbed by the central portion of the eyelet remotely of the plastic material. The eyelet inside diameter is sufficient to give clearance around the fastener head for a socket wrench or the like for tightening or loosening of the fastener. It has been found, however, in applying the teachings of the patent in other environments that there is often insufficient space available to allow such socket wrench clearance. For example, in a plastic replacement for a metal transmission or engine oil sump cover in an internal combustion engine, there is insufficient space between the axis of the mounting opening and an adjacent cover wall perpendicular to the mounting plane to permit such clearance.

An object of the present invention, therefore, is to provide an improved mounting arrangement of the described type which embodies the advantages of the aforementioned prior art in terms of removing clamping stresses from the plastic material, while overcoming the deficiencies in terms of spatial requirements.

Another and more specific object of the invention is to provide a mounting arrangement of the described type which reduces space requirements of the mounting eyelet and fastener head, while retaining facility for use of a socket wrench or the like for loosening or tightening of the fastener.

A further and yet more specific object of the invention is to provide a mounting arrangement of the described type which finds particular utility in the automotive original equipment market, and in the equipment aftermarket for replacement of original equipment metal oil pan, transmission pan, rocker arm, timing chain or differential housing covers, or the like, with suitable plastic replacements. Another and related object of the invention is to provide a mounting arrangement which is adapted for the provision of such original equipment or replacement cover as a complete assembly adapted for use with original equipment mounting openings and fastener hardware.

BRIEF DESCRIPTION OF DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
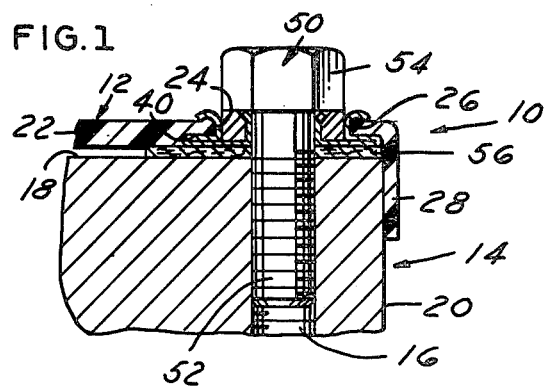
FIG. 1 is a fragmentary sectional view of a mounting arrangement in accordance with one presently preferred embodiment of the invention.
Figure 2:
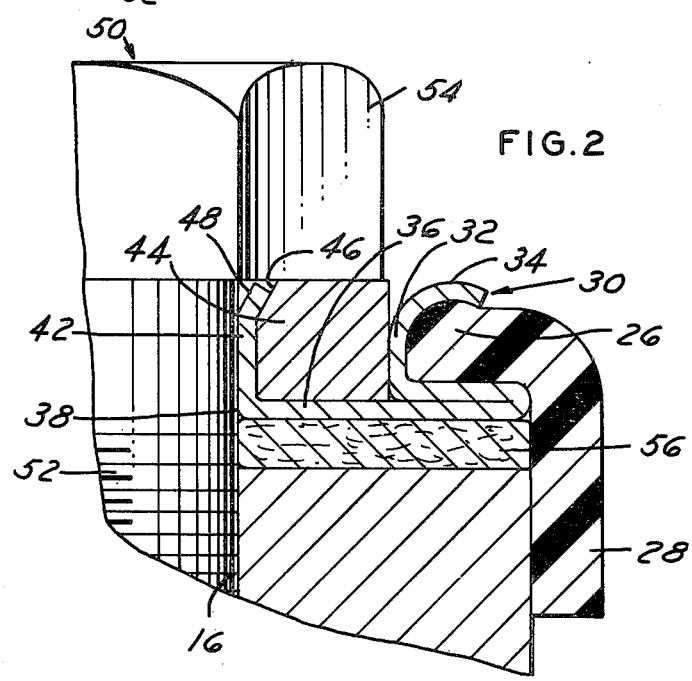
FIG. 2 is a fragmentary sectional view on an enlarged scale of a portion of FIG. 1.

FIGS. 1 and 2 illustrate a presently preferred embodiment 10 of the mounting arrangement in accordance with the invention for tightly and sealingly clamping a plastic workpiece 12 to a rigid support 14. In the particular embodiment shown, workpiece 12 may comprise a plastic replacement for a conventional oil pan, transmission pan, rocker arm, timing chain or differential housing cover in the automotive original equipment or aftermarket. In such application, support 14 would comprise the corresponding metal engine or pump housing, etc. Support 14 includes threaded openings 16 (only one being shown) at locations prespecified by the original equipment manufacturer, a plane mounting surface 18 perpendicular to the axis of opening 16 and a side surface 20.

Workpiece 12, which may be of fiber-reinforced nylon or other suitable plastic resin construction, includes a plane wall 22 having a plurality of mounting openings 24 (only one being shown) each defined by a circumferentially continuous annular bead 26. A skirt 28 projects perpendicularly from wall 22. A one-piece metal eyelet 30 is positioned in each opening 24, and comprises a circumferentially continuous portion 32 with a flange 34 sealingly crimped over bead 26 and a plane central portion 36 with a central opening 38. Each eyelet opening 38 is adapted for alignment in assembly with a corresponding support opening 16. Eyelet central portion 36 is seated within a recessed shoulder 40 (FIG. 1) in wall 22 and firmly held thereagainst by crimped flange 34 such that the inner surface of portion 36 is coplanar in assembly with the adjacent inner surface of wall 22. Eyelet 30 is preferably stamped and formed of sheet metal stock of generally uniform thickness substantially less than the thickness of workpiece 12.

An annular neck or collar 42 integrally projects from eyelet central portion 36 surrounding and defining opening 38. An annular solid spacer 44 is seated in flat facing engagement against eyelet central portion 36 within peripheral portion 32 and surrounding neck 42. Spacer 44 may be of metal or other suitable construction for absorbing compressive clamping load without creep or deformation. The central opening of spacer 44 has an edge 46 remote from portion 36 which is outwardly beveled with respect to the opening axis. The end 48 of neck 42 is flared outwardly against edge 46 to capture spacer 44 on eyelet 30. A hex head bolt 50 has a threaded shank 52 which projects through neck 42 into support opening 16, and a head 54 which engages spacer 44 for clamping eyelet 30, and therefore plastic workpiece 12, to support 14, a suitable sealing gasket 56 being disposed therebetween where desired.

Thus, there is provided in accordance with the invention a mounting arrangement which permits the use of inexpensive and light-weight plastic covers and the like in the automotive original equipment and/or replacement aftermarket. Note that, in the environment of the replacement aftermarket, such covers may be used in place of original equipment metal covers while accommodating original equipment mounting openings and hardware. Specifically, the cover 12, eyelet 30 and spacer 44 may be provided as a complete assembly useable with bolts 50 or other original equipment hardware. Note that the thickness of spacer 44 parallel to the bolt axis is at least equal to the thickness of eyelet peripheral portion 32, so that the head 54 of bolt 50 is spaced above cover wall 22 and accessable to a socket wrench or the like.

Figure 3:
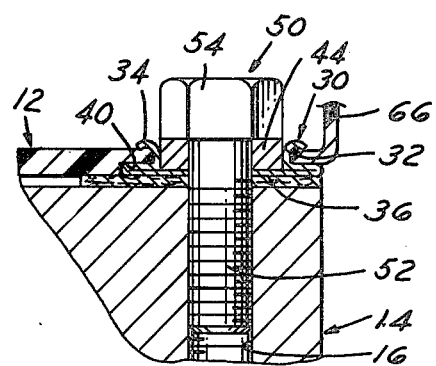
FIG. 3 is a view similar to that of FIG. 1 of an alternative embodiment of the invention.

FIG. 3 illustrates an alternative embodiment of the mounting arrangement in accordance with the invention wherein spacer 44 is captured on eyelet 30 by adhesive material between the opposing surface of spacer 44 and eyelet central portion 36 and/or by interference press-fit between the outside diameter of spacer 44 and the corresponding inside diameter of eyelet peripheral portion 32. In the embodiment of FIG. 3, the workpiece skirt 66 projects oppositely of skirt 28 in FIGS. 1 and 2, the orientation of the skirt being a matter of the particular application or environment of the invention as used.

The invention claimed is:

1. A mounting arrangement for clamping a plastic workpiece against a rigid support comprising a threaded opening in said support, a circular opening in said workpiece defined by a continuous annular bead, a one-piece eyelet of metal construction having a circumferentially continuous peripheral portion with a flange in fastening engagement with said bead and a flat central portion with a central opening adapted in assembly to register with said threaded opening, said peripheral portion including said flange having a predetermined diameter and thickness, an annular spacer of metal construction carried by said eyelet in facing engagement with said eyelet central portion with a central opening in registry with said eyelet opening and a thickness at least equal to said predetermined thickness, and a headed threaded fastener having a shank removably extending through said spacer and eyelet openings into said threaded opening and a head in clamping engagement with said spacer, whereby compressive clamping stresses are transferred from the fastener head through the spacer to the eyelet central portion, said spacer opening having an outwardly beveled circular edge at a surface remote from said eyelet central portion, and said eyelet further including a neck integrally projecting from said central portion coaxially with said eyelet opening through said spacer opening, the end of said neck remote from said central portion being flared outwardly against said beveled edge to capture said spacer on said eyelet.

2. The mounting arrangement set forth in claim 1 wherein said workpiece includes a recessed shoulder surrounding said circular opening, and wherein said central portion of said eyelet is disposed within said recessed shoulder such that the surface of said eyelet facing said support is generally coplanar with the adjacent surface of said workpiece.

* * * * *